United States Patent
Zimmet et al.

(10) Patent No.: US 6,854,968 B2
(45) Date of Patent: Feb. 15, 2005

(54) COMPOUNDER-TYPE INJECTION MOLDING MACHINE

(75) Inventors: Rainer Zimmet, Neckarwestheim (DE); Jochen Zwiesele, München (DE); Thomas Steinherr, Wessling (DE)

(73) Assignee: Krauss-Maffei Kunststofftechnik GmbH, München (DE)

(*) Notice: Subject to any disclaimer, the term of this patent is extended or adjusted under 35 U.S.C. 154(b) by 268 days.

(21) Appl. No.: 10/278,212

(22) Filed: Oct. 22, 2002

(65) Prior Publication Data

US 2003/0075821 A1 Apr. 24, 2003

(30) Foreign Application Priority Data

Oct. 23, 2001 (DE) .......................................... 101 52 244

(51) Int. Cl.[7] .............................................. B23C 45/77
(52) U.S. Cl. ...................... 425/145; 425/149; 425/557; 425/558
(58) Field of Search ................................ 425/145, 146, 425/149, 557, 558

(56) References Cited

U.S. PATENT DOCUMENTS 5,605,707 A * 2/1997 Ibar .......................... 425/149
6,695,994 B2 * 2/2004 Bulgrin et al. .............. 425/145

FOREIGN PATENT DOCUMENTS

| DE | 1 142 229 | 7/1963 |
| DE | 199 28 770 A | 8/2000 |
| DE | 100 18 542 A1 | 10/2001 |
| EP | 1 013 397 A | 6/2000 |
| JP | 36-19372 | 7/1961 |
| JP | 05 337993 A | 12/1993 |
| JP | 2000 167896 A | 6/2000 |
| WO | WO 92/00838 | 1/1992 |

* cited by examiner

Primary Examiner—Tim Heitbrink
(74) Attorney, Agent, or Firm—Henry M. Feiereisen

(57) ABSTRACT

In a compounder-type injection molding machine having an extruder for continuously producing a melt and at least one injection device is fluidly connected to the extruder to receive melt, a reservoir is provided which is in fluid communication with the extruder as well as with the injection device for temporary storage of melt. In order to maintain a pressure at a desired level at the outlet of the extruder, a pressure sensor is provided for ascertaining a melt pressure state downstream of an outlet of the extruder. The pressure sensor outputs a signal, commensurate with the melt pressure state, to a control unit for activating a drive in the reservoir or a drive in the injection device in response to the signal according a predetermined algorithm.

7 Claims, 2 Drawing Sheets

COMPOUNDER-TYPE INJECTION MOLDING MACHINE

CROSS-REFERENCES TO RELATED APPLICATIONS

This application claims the priority of German Patent Application, Serial No. 101 52 244.4, filed Oct. 23, 2001, pursuant to 35 U.S.C. 119(a)–(d), the disclosure of which is incorporated herein by reference.

BACKGROUND OF THE INVENTION

The present invention relates, in general, to a compounder-type injection molding machine for mixing and then injecting materials into an injection mold.

Compounder-type injection molding machines of a type involved here are known for example from German Pat. No. DE 11 42 229, International Pat. Publication WO92/00838 or Japanese Pat. No. JP-Y36-19372. Common to all these prior art injection molding machines is the provision of a continuously operating extruder which is charged with initial plastic material, e.g., plastic granulate, to produce a plastic melt. The extruder may be configured in many different ways, e.g., as single screw extruder or twin screw extruder with screws rotating in a same direction or in opposite directions. Other configurations involve the provision of one or more feed openings for mixing several materials.

During continuous operation of the extruder screws, melt is provided constantly at the extruder outlet for transfer to an injection chamber of an injection device for subsequent introduction to an injection mold by means of a reciprocating plunger.

Compounder-type injection molding machines are useful, when several materials have to be mixed, for example, admixture of fibers to a plastic melt for providing fiber-reinforced materials.

A problem experienced in conventional compounder-type injection molding machines is the combination of a continuously operating extruder with an intermittently operating injection device. Various proposals have been made to address this problem. One approach involves the provision of a reservoir to form an intermediate storage for receiving melt delivered by the extruder while the injection phase of the injection device is carried out. As the injection device is filled again during the filling phase, the reservoir is emptied while the extruder continues to operate. Another approach involves the provision of several injection devices, which are alternatingly filled with melt. However, for a number of reasons, the various proposals are endowed with drawbacks and shortcomings. One problem of conventional injection molding machines is the absence of a constant melt quality which directly affects the material being ultimately produced. The melt quality may be adversely affected as a result of pressure fluctuations in the extruder or downstream of the extruder. Heretofore, attempts to address the problem of pressure fluctuations involve the use of dynamic pressure measurements with respect to the hydraulic pressure. These types of measurements are, however, inaccurate.

It would therefore be desirable and advantageous to provide an improved compounder-type injection molding machine to obviate prior art shortcomings and to ensure a constant melt quality.

SUMMARY OF THE INVENTION

According to one aspect of the present invention, an injection molding machine includes an extruder for continuously producing a melt, at least one injection device fluidly connected with the extruder by a first conduit to receive melt and including an injection ram movable to a forward position, in which melt is injected into an injection mold, and a rear position, in which melt is introduced into the injection device, a pressure sensor, disposed in the extruder or in an area between the extruder and the injection device, for ascertaining a melt pressure downstream of an outlet of the extruder and outputting a signal commensurate with the ascertained melt pressure, a control unit receiving the signal from the pressure sensor; and a drive operated by the control unit for actively moving the injection ram backwards in response to the signal according to a predetermined algorithm.

According to another aspect of the present invention, an injection molding machine includes an extruder for continuously producing a melt, at least one injection device fluidly connected with the extruder by a first conduit to receive melt and intermittently injecting melt into an injection mold, a reservoir, fluidly connected to the extruder as well as to the injection device, for temporary storage of melt, a pressure sensor, disposed in the extruder or in an area between the extruder and the reservoir, for ascertaining a melt pressure downstream of an outlet of the extruder and outputting a signal commensurate with the ascertained melt pressure, a control unit receiving the signal from the sensor; and a regulating device, received in the reservoir and having a drive mechanism, for adjusting a fill degree in the reservoir by expelling melt and/or introducing melt into the reservoir to a predetermined level, wherein the drive mechanism is controlled by the control unit in response to the signal in accordance with a predetermined algorithm.

Suitably, the drive mechanism includes a plunger which is moved back and forth within the reservoir to thereby adjust the volume of the reservoir.

The present invention resolves prior art problems by ascertaining the melt pressure in or downstream of the extruder and to provide measures to adjust the melt pressure to a predetermined desired pressure level. By adjusting the melt pressure in this way, the melt quality can be ensured in a superior manner. In one embodiment, the melt pressure is kept constant to a desired level by moving the injection ram of the injection device backwards as melt is introduced during the filling phase of the injection cylinder of the injection device. The retraction of the injection ram is hereby active and controlled through provision of a pressure sensor which outputs a signal indicating a melt pressure state, to a control unit which uses the melt pressure state as controlled variable to move the injection ram backwards in a desired manner to thereby adjust the actual pressure value to the desired pressure level.

On the other hand, when the injection phase is carried out, the afore-described measure is not applicable for the injection ram and injection cylinder that participate in the injection of melt into the injection mold. Thus, a pressure control in accordance with the present invention also during the injection phase requires either the provision of several injection cylinders which are alternatively switched over so that the melt pressure control can be applied alternately for the injection cylinders, or the provision of a reservoir for temporary storage of melt. In the latter case, the reservoir can be charged in a way that the pressure downstream of or within the extruder can be maintained at a predetermined pressure level. This can be implemented by operating a drive mechanism in the reservoir to adjust a volume in the reservoir in a manner that the introduction of melt into the reservoir maintains the pressure in or downstream of the extruder in a desired manner.

According to still another aspect of the present invention, a method of operating an injection device of an injection molding machine having an extruder, includes the steps of ascertaining a melt pressure downstream of an outlet of the extruder; comparing the melt pressure with a given desired pressure; generating a control signal in response to a deviation between the ascertained melt pressure and the desired pressure; and activating a drive for the injection device during filling mode in response to the control signal to adjust the melt pressure to a level corresponding with the desired pressure.

According to still another aspect of the present invention, a method of operating an injection device of an injection molding machine having an extruder, includes the steps of ascertaining a melt pressure downstream of an outlet of the extruder; comparing the melt pressure with a given desired pressure; generating a control signal in response to a deviation between the ascertained melt pressure and the desired pressure; and activating a drive in a reservoir between the extruder and an injection device during injection mode in response to the control signal to adjust the melt pressure to a level corresponding with the desired pressure.

In either one of the afore-stated methods, a controlled variable is ascertained in response to a deviation between the actually measured pressure of the melt and a desired value, and used as input variable of the respective drive to maintain the desired pressure level at or in the extruder.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
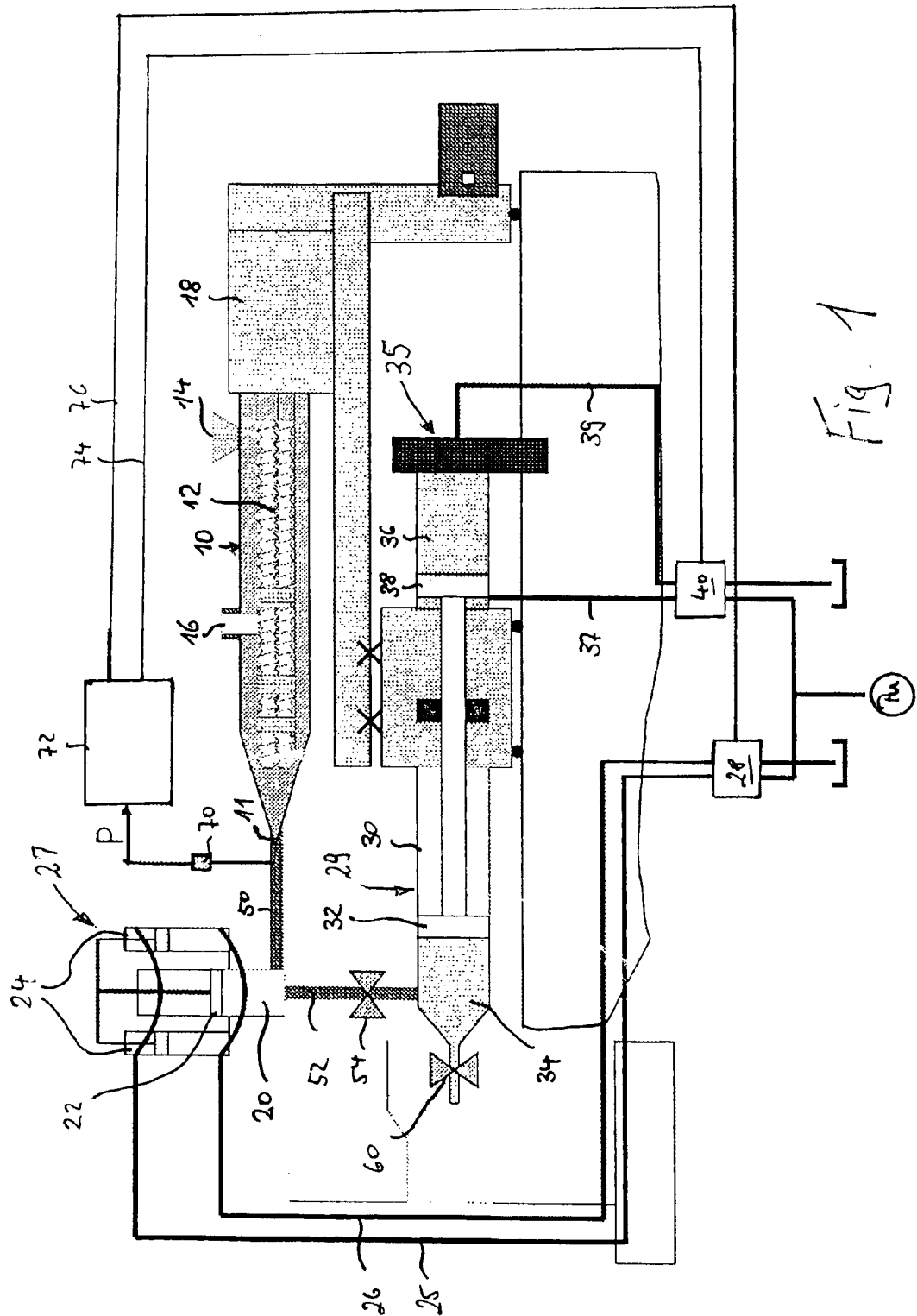
FIG. 1 shows a greatly schematic illustration of one embodiment of a compounder-type injection molding machine according to the present invention.

Turning now to the drawing, and in particular to FIG. 1, there is shown a greatly schematic illustration of a compounder-type injection molding machine according to the present invention including a twin screw extruder generally designated by reference numeral 10 and having two screws 12 which rotate in a same direction through operation of a drive 18. The extruder 10 may be of any commercially available construction and is shown here by way of example only. Of course, It is to be understood that the principles described in the following description with respect to twin screw extruder 10 are generally applicable to other types of extruders as well, e.g. single screw extruder or twin screw extruder with screws rotating in opposite direction.

Various materials can be introduced into the extruder 10 via a feed opening 14 and a feed opening 16. For example, plastic granulates can be supplied through the feed opening 14 whereas fibers can be supplied into the extruder 10 via feed opening 16.

The extruder 10 has an outlet 11 which is connected to a conduit 50 leading to a reservoir 20 in which melt produced by the extruder 10 can be temporarily stored. Received in the reservoir 20 is a plunger 22 for back and forth movement to thereby change the volume in the reservoir 20. The movement of the plunger 22 is implemented by a regulating device including a hydraulic drive system, generally designated by reference numeral 27 and including a control valve 28 connected via hydraulic lines 25, 26 to two parallel hydraulic cylinders 24. Depending on the activation of the control valve 28, the plunger 22 can be moved actively upwards or downwards via the hydraulic lines 25, 26 to thereby expel melt from the reservoir 20 and introduce melt into the reservoir 20.

A conduit 52 connects an outlet of the reservoir 20 with an injection device, generally designated by reference numeral 29. Disposed in the conduit 52 is a shutoff valve 54 to regulate a flow of melt between the reservoir 20 and a melt chamber 34 of the injection device 29. The injection device 29 includes an injection cylinder 30 and an injection ram 32 reciprocating in the injection cylinder 30, whereby the melt chamber 34 is provided in the forward portion of the injection cylinder 30, anteriorly of the injection ram 32. Reciprocation of the injection ram 32 is implemented by a drive mechanism, generally designated by reference numeral 35 so that the ram 32 can be actively pushed forward or pulled backwards. The drive mechanism 35 is realized in the form of a hydraulic system, comprised of a control valve 40, a hydraulic cylinder 36 and a hydraulic plunger 38, whereby the control valve 40 is connected via hydraulic lines 37, 39 to the hydraulic cylinder 36 on opposite sides of the hydraulic plunger 38. The hydraulic plunger 38 is connected to the injection ram 32 so that a movement of the hydraulic plunger 38 is translated in a movement of the injection ram 32 in a same direction.

Both control valves 28, 40 are operatively connected via control lines 74, 76 to a control unit 72 which has an input for receiving an output signal of a pressure sensor 70. In the non-limiting example of FIG. 1, the pressure sensor 70 determines a melt pressure in the conduit 50 near the outlet 11 of the extruder 10. Of course, the pressure sensor 70 may also be disposed to determine a melt pressure in a forward region of the extruder 10. Relevant is only a pressure measurement of the melt inside the extruder 10 or at a location in immediate proximity to the outlet 11 of the extruder 10.

The injection molding machine operates as follows: The screws 12 of the extruder 10 are continuously driven by the drive 18, whereby starting materials are introduced continuously into the extruder 10 in controlled doses through feed openings 14, 16. The extruder 10 mixes the starting materials to produce a melt which is discharged through outlet 11 in the form of a continuous stream which is directed through conduits 50, 52 to the injection device 29. The injection device 29 operates essentially in two cycles, namely a filling phase and an injection phase. In the injection phase, the shutoff valve 54 is closed to prevent melt pressure, building up in the injection device 29 from acting in the direction of reservoir 20, and to allow injection of melt into an injection mold (not shown) via a shutoff valve 60, which is open. After conclusion of the injection phase, shutoff valve 60 is closed and shutoff valve 54 is opened to initiate the filling phase in which the injection ram 32 moves backwards as the melt chamber 34 of the injection device 29 is filled again via conduit 52 with melt. Melt produced by the extruder 10 is temporarily stored in the reservoir 20 during the injection procedure, whereby the plunger 22 is hereby moved back to expand the volume in the reservoir 20.

In order to realize a desired pressure level of melt inside the extruder 10, the melt pressure is ascertained at the extruder outlet 11 by the pressure sensor 70 which generates a control signal P commensurate with the measured melt pressure and feeds the control signal P to the control unit 72 which has stored therein a desired pressure value. The control unit 72 compares the actual melt pressure state with the desired pressure value and generates in response to a pressure deviation a controlled variable which is used as input variable for the control valves 28, 40.

Depending on the operational state of the injection molding machine, the following adjustments are triggered. When the injection molding machine is in the filling phase and valve 54 in conduit 52 is open, the control unit 72, in response to a pressure deviation, instructs the control valve 40 to activate the drive mechanism 35 to move the injection ram 32 back to expand the volume of the melt chamber 34. As a consequence, the actual melt pressure is adjusted to the desired level. When, on the other hand, the injection molding machine operates in the injection phase, in which the valve 54 in the conduit 52 is closed, the control unit 72, in response to a pressure deviation, instructs the control valve 28 to activate the drive system 27 to move the plunger 22 backwards in the reservoir 20 until the actual melt pressure is adjusted also during the injection phase to the desired level. The hydraulic pressure for both control valves 28, 40 is applied respectively by a respective pump Pu.

In this way, the pressure level near or in the extruder 10 can be adjusted in both operational states of the injection molding machine in a desired manner to thereby ensure a constant and uniform melt quality.

Figure 2:
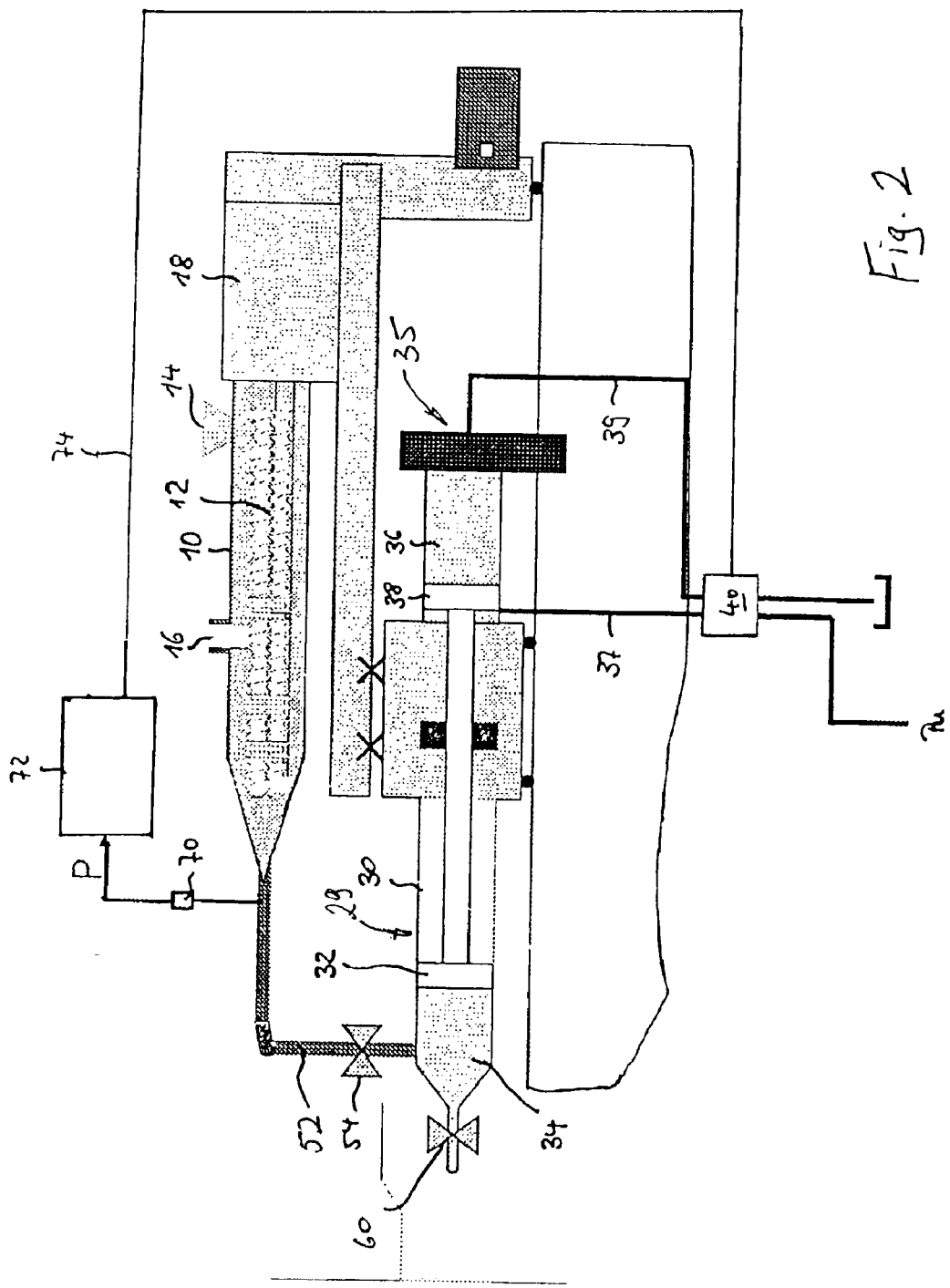
FIG. 2 shows a greatly schematic illustration of another embodiment of a compounder-type injection molding machine according to the present invention.

Turning now to FIG. 2, there is shown a greatly schematic illustration of another embodiment of a compounder-type injection molding machine according to the present invention. Parts corresponding with those in FIG. 1 are denoted by identical reference numerals and not explained again. The injection molding machine involved here includes a twin screw extruder 10 which is directly connected to the injection device 29, without provision of an intermediate reservoir. When the injection molding machine is in the filling phase and valve 54 in conduit 52 is open, the control unit 72, in response to a pressure deviation, instructs the control valve 40 to activate the drive mechanism 35 to move the injection ram 32 back to expand the volume of the melt chamber 34. As a consequence, the actual melt pressure is adjusted to the desired level.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated. For example, the use of several injection devices is possible which are alternately switched for implementing the filling operation of melt into the injection mold. In this case, the injection cylinder of each injection device can be used for implementing the closed loop control during the filling procedure in order to adjust the actual pressure of the melt to the desired pressure value at the end of the extruder.

What is claimed as new and desired to be protected by Letters Patent is set forth in the appended claims and their equivalents:

1. An injection molding machine, comprising:
   an extruder for continuously producing a melt;
   at least one injection device fluidly connected with the extruder by a first conduit to receive melt and including an injection ram movable to a forward position for injection of melt into an injection mold and a rear position for introduction of melt into the injection device;
   a pressure sensor, disposed in a location selected from the group consisting of inside the extruder and an area between the extruder and the injection device, for ascertaining a melt pressure state downstream of an outlet of the extruder and outputting a signal commensurate with the melt pressure state;
   a control unit receiving the signal from the pressure sensor; and
   a drive mechanism operated by the control unit for actively moving the injection ram backwards in response to the signal according to a predetermined algorithm.

2. The injection molding machine of claim 1, wherein the drive mechanism is a hydraulic drive and includes at least one control valve.

3. The injection molding machine of claim 1, wherein the drive mechanism is an electric drive.

4. An injection molding machine, comprising:
   an extruder for continuously producing a melt;
   at least one injection device fluidly connected with the extruder by a first conduit to receive melt for intermittent injection into an injection mold;
   a reservoir in fluid communication with the extruder as well as with the at least one injection device for temporary storage of melt;
   a pressure sensor, disposed in a location selected from the group consisting of inside the extruder and an area between the extruder and the reservoir, for ascertaining a melt pressure state downstream of an outlet of the extruder and outputting a signal commensurate with the melt pressure state;
   a control unit receiving the signal from the pressure sensor; and
   a regulating device, received in the reservoir and having a drive mechanism, for expelling melt from the reservoir or charging melt into the reservoir to a predetermined level, wherein the control unit is so constructed as to control the drive mechanism in response to the signal in accordance with a predetermined algorithm.

5. The injection molding device of claim 4, wherein the drive mechanism includes a reciprocating plunger.

6. The injection molding device of claim 5, wherein the regulating device includes a hydraulic system for moving the plunger in one direction for expulsion of melt and in an opposite direction for filling reservoir with melt.

7. The injection molding device of claim 5, wherein the regulating device includes an electric system for moving the plunger in one direction for expulsion of melt and in an opposite direction for filling reservoir with melt.

* * * * *